United States Patent
Campagnone et al.

(10) Patent No.: US 10,919,426 B1
(45) Date of Patent: Feb. 16, 2021

(54) CONSOLE MOUNTABLE TRAY FOR A MOTOR VEHICLE

(71) Applicants: Jordan Campagnone, Somerset, MA (US); Rebecca Campagnone, Somerset, MA (US)

(72) Inventors: Jordan Campagnone, Somerset, MA (US); Rebecca Campagnone, Somerset, MA (US)

( * ) Notice: Subject to any disclaimer, the term of this patent is extended or adjusted under 35 U.S.C. 154(b) by 18 days.

(21) Appl. No.: 16/014,225

(22) Filed: Jun. 21, 2018

Related U.S. Application Data (63) Continuation-in-part of application No. 62/524,886, filed on Jun. 26, 2017.

(51) Int. Cl.
*A47B 23/00* (2006.01)
*B60N 3/00* (2006.01)
*B60R 7/04* (2006.01)

(52) U.S. Cl.
CPC .............. *B60N 3/002* (2013.01); *B60R 7/04* (2013.01)

(58) Field of Classification Search
CPC ............ B60R 7/04; B60N 3/002; B60N 2/793
USPC .......................................................... 108/44
See application file for complete search history.

(56) References Cited

U.S. PATENT DOCUMENTS

| | | | |
|---|---|---|---|
| 4,040,659 A | 8/1977 | Arnold | 297/194 |
| 5,131,716 A | 7/1992 | Kwasnik | 297/194 |
| 5,489,054 A | 2/1996 | Schiff | 224/281 |
| 5,588,697 A | 12/1996 | Yoshida et al. | 297/173 |
| 5,620,228 A * | 4/1997 | Ito | A47C 7/68 297/188.17 |
| 6,032,587 A * | 3/2000 | Salenbauch | B60N 3/002 108/44 |
| 6,161,486 A * | 12/2000 | Boots | A47B 5/06 108/33 |
| 6,394,001 B1 * | 5/2002 | Giesey | B60N 3/002 108/44 |
| 7,011,273 B1 * | 3/2006 | Stanford | B60N 3/102 224/275 |
| 2010/0213729 A1 * | 8/2010 | Spitler | B60N 3/101 296/1.08 |
| 2010/0314896 A1 | 12/2010 | Skibiniski | 296/24.34 |

(Continued)

FOREIGN PATENT DOCUMENTS

CN 203713628 U 7/2014
WO WO 2015-063412 A 5/2015

OTHER PUBLICATIONS

Epacenet Engl. Abstract of CN-203-713-658-U (Hyundai).
Espacenet Engl. Abstract of WO-2015-063412-A (Peugeot).

*Primary Examiner* — Matthew W Ing (57) ABSTRACT

A center console for a motor vehicle includes a tray (11) which can be deployed in the direction of the vehicle dashboard. The tray is mounted on top of a generally rectangular base portion (10) which provides storage space, accessible by pivoting upward the tray components and a cover (1), both of which are hinged (6, 28, 30) on an upper rear lip of the box. The tray includes panels (113, 114) which slide out to left and right to provide a larger support surface for papers, food and/or beverages. A support leg (116) under the forwardly extending tray can pivot (13, 117) to a diagonal orientation, engaging with a front face of the base portion (10), to provide additional support and bearing capacity to the deployed tray (111).

4 Claims, 7 Drawing Sheets

(56) References Cited

U.S. PATENT DOCUMENTS

2015/0284090 A1* 10/2015 Stephens ............ B64D 11/0638
                                                    297/163
2016/0107550 A1    4/2016 Hwang ................ B60N 2/4686

* cited by examiner

CONSOLE MOUNTABLE TRAY FOR A MOTOR VEHICLE

RELATED APPLICATION

This application is a continuation-in-part of my provisional application Ser. No. 62/524,886, filed 26 Jun. 2017, the entire content of which is hereby incorporated by reference.

FIELD OF THE INVENTION

The present invention relates generally to a tray for use in a motor vehicle such as a car, truck, tractor, or airplane and, more particularly, to a tray which is supported on a center console of a sport utility vehicle (SUV).

BACKGROUND

It has long been known, for example at drive-in restaurants, to provide a cantilevering food-and-beverage tray which can be temporarily supported on the outside of a partly rolled-down window. This has the disadvantages that, for the duration of the meal, the window must remain open to wind, mosquitoes, flies and other insects, and that if any precipitation occurs, the rain, snow or hail falls on the exposed tray, and may even blow into the interior of the vehicle. Further, it has been known, in vehicles, to provide a central armrest or console, between the driver's seat and the front-right passenger's seat. This console can provide internal storage space and can support a clipboard, electronic tablet or similar kind of planar surface, for doing paperwork. Many tradespersons, such as electricians, plumbers, painters, cleaning services, general contractors and landscapers, spend significant fractions of each working day in a vehicle, and therefore need a weather-protected multipurpose device which provides one or more surfaces, usable both for doing data entry and for eating "on the run." Both uses may arrive in rapid succession, for example when it is necessary to finish a job, invoice the customer, and obtain food and beverages before returning to a sometimes-distant "home base."

SUMMARY OF THE INVENTION

Accordingly, I have devised an improved center console, which provides internal storage space, a movable tray which can easily be changed between a deployed configuration and a stowed configuration, and a cover which protects the aforementioned components when not in use, and serves as a comfortable armrest when necessary.

Preferably, my improved console has a base portion resembling an open-topped rectangular box, with an upper rim which serves for mounting additional components. Atop the box are mounted horizontally deployable tray components, preferably including a support leg which, in the deployed configuration, increases the weight-bearing capacity of the tray components. Finally, a smooth-surfaced cover component sits on top of the tray components. In order to keep all components connected to each other, the tray components and the cover are preferably coupled to the base portion by a hinge formed along the rear upper rim of the box-like base portion. The resulting structure is sturdy, adaptable for multiple uses, and suitable for installation either in new vehicles or for retrofitting into already-existing vehicles.

DETAILED DESCRIPTION

Figure 1:
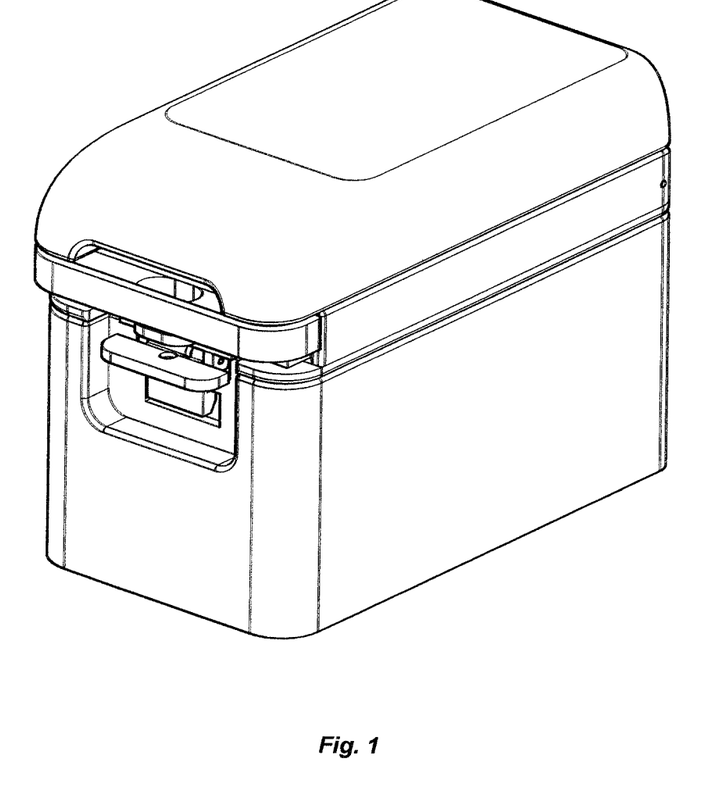
FIG. 1 illustrates a preferred embodiment of the vehicle center console and tray of the present invention, in a minimized or retracted or "stowed" configuration.

FIG. 1 is a perspective view of a preferred version of a vehicle console 100 of the present invention. It is generally rectangular, having an open-topped bottom storage portion 10, a midframe portion 5 which mounts atop storage portion 10, and a pivotable cover 1 on top of the aforementioned portions 10 and 5. Movable tray components are slidably received within midframe portion 5. Preferably, cover 1 is pivotable about a horizontal pivot (6, 28, 30, 32) near a back side of the cover.

Figure 2A:
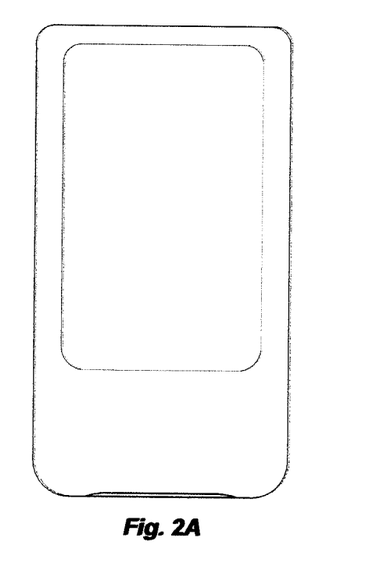
FIGS. 2A, 2B and 2C are a top view, a front side view and a left side view of the invention, the right side view being essentially a mirror image of the left side view of FIG. 2C.

As shown in FIG. 2A, cover 1 preferably has 4 rounded corners and has a generally rectangular flat smooth central region suitable for use as a writing surface, or as an armrest for a vehicle passenger.

Figure 2B:
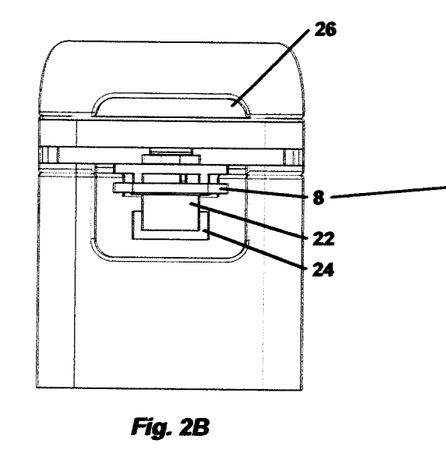

As shown in FIG. 2B, cover 1 is formed, along a lower periphery of its front, with a notch 26, so that a user can use fingertips inserted into notch 26 to exert an upward pivoting force on cover 1. Pivotably attached to a front of midframe 5 is a latch handle 8 formed with a depending claw 22 adapted to engage in a rectangular cutout 24 formed in bottom storage portion 10. Latch handle 8 serves to secure midframe 5 to bottom portion 10 when access to the interior thereof is not needed, and a torque spring 7 biases the latch into an engaged state.

Figure 2C:
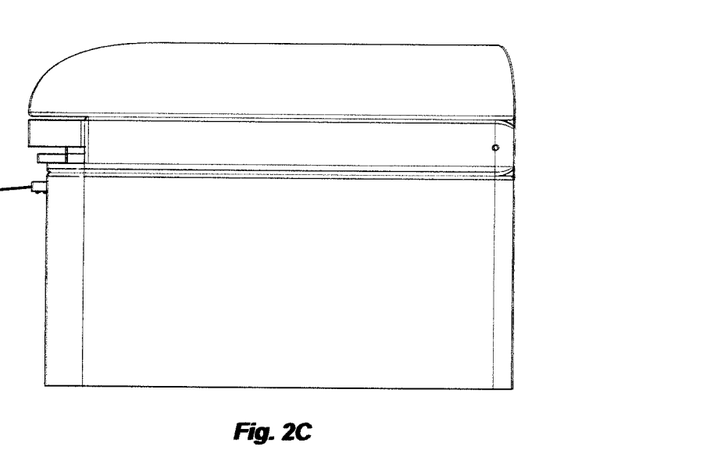

FIG. 2C is a side view, illustrating that bottom portion 10 is slightly recessed with respect to a front of cover 1 and that latch handle 8, in a rest orientation, protrudes slightly from a front face of bottom portion 10.

Figure 3:
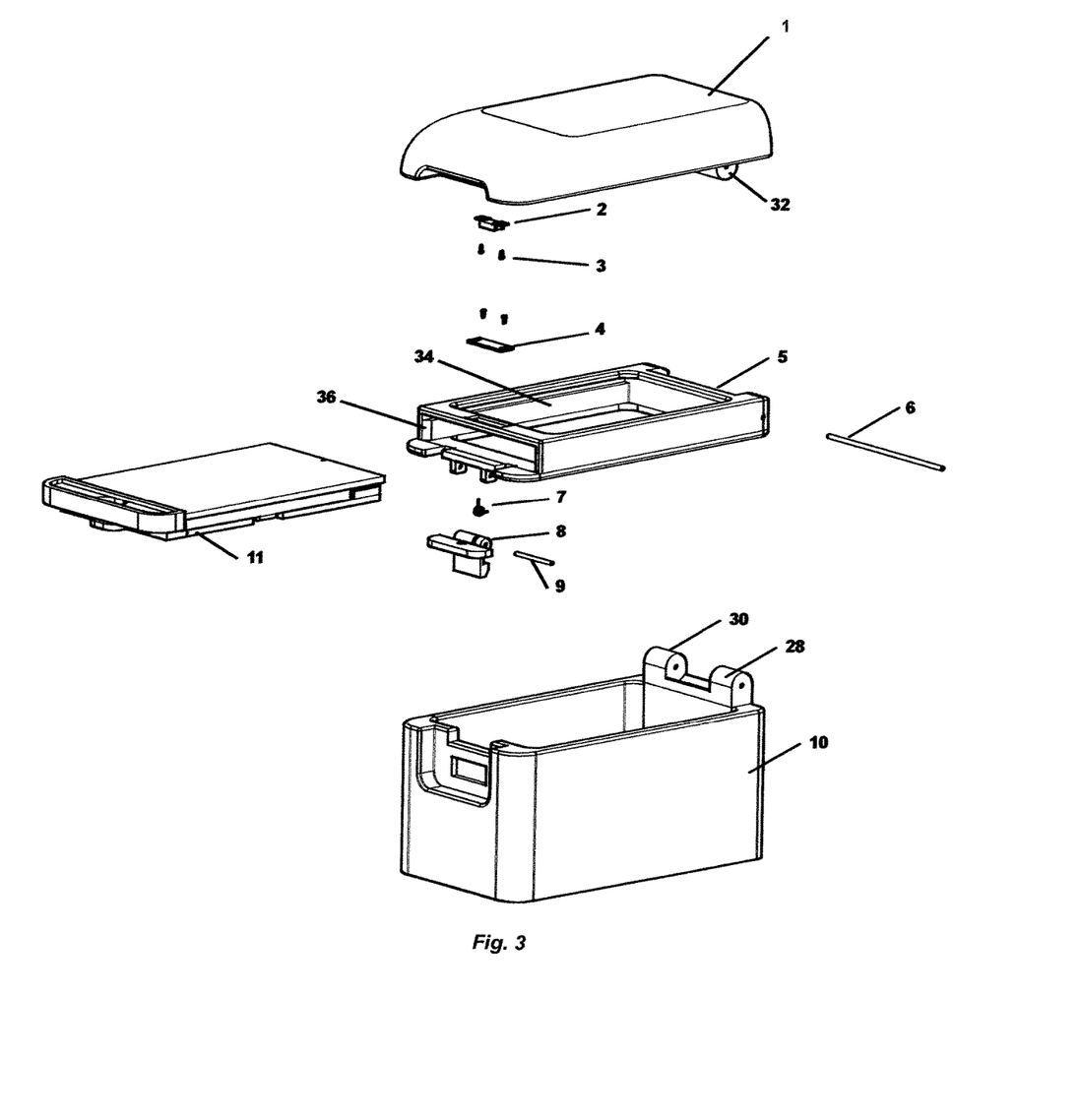
FIG. 3 is an exploded perspective view of the invention, illustrating connections between movable components of the invention.

The exploded view of FIG. 3 illustrates the components of the device in greater detail. Preferably a back wall of bottom storage portion 10 is integrally formed with hinge elements, namely a left barrel portion 28 and a right barrel portion 30, each formed with co-linear central bores. These cooperate with a central barrel portion 32 formed on cover 1. When everything is assembled together, a horizontal metal hinge pin 6 extends through all the central bores of barrel portions 28, 32 and 30, thereby enabling one to open storage portion 10 by pivoting cover 1 into a diagonal or vertical orientation.

Midframe portion 5 has a generally rectangular central cavity 34 which is accessible via a rectangular aperture 36 is a front of portion 5, enabling sliding reception of a foldable tray structure 11 in central cavity 34. Above aperture 36 is a seat to receive a metal plate 4, which cooperates with a permanent magnet 2 secured to cover 1. Plate 4 and magnet 2 can be attached respectively to midframe 5 and to cover 1 using screws 3.

Beneath aperture 36 is a place to pivotable attach latch handle 8 to midframe 5. Preferably a torque spring 7 is used to bias latch handle 8 toward engaging its claw into cutout 24, to keep midframe 5 secured against bottom 10. However, by lifting up handle 8, against the force of spring 7, one can pivot the claw out of engagement with bottom portion 10 and thereby open the storage space within. A horizontal hinge pin 9 mounts handle 8 on midframe 5.

Figure 4:
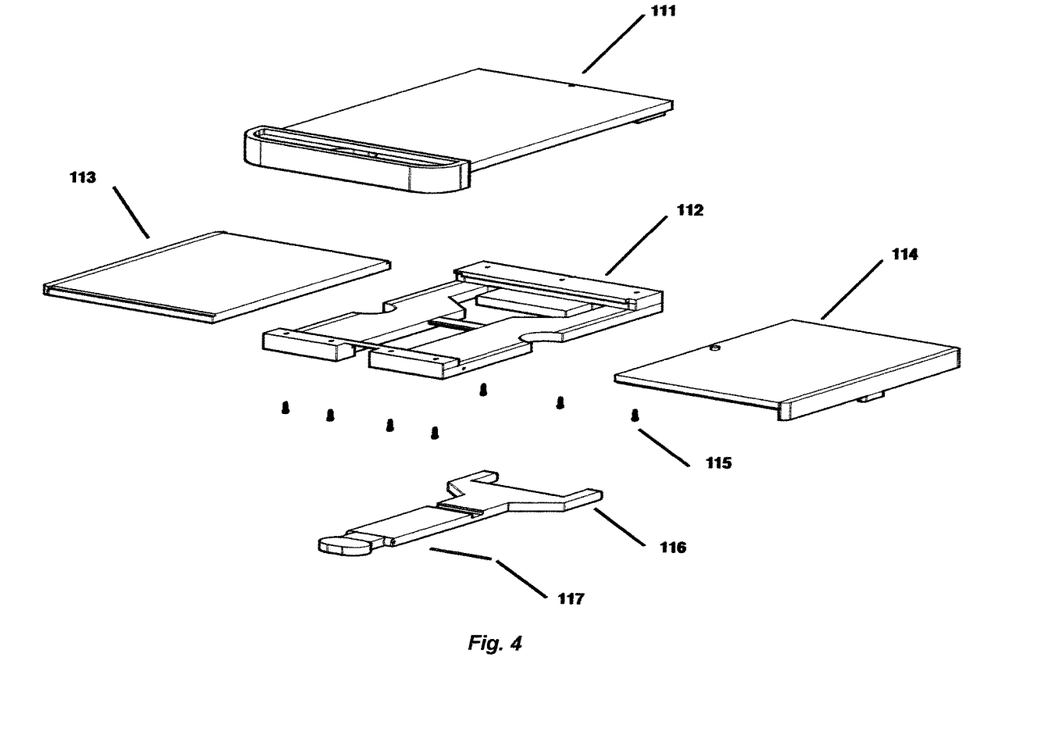
FIG. 4 illustrates several components of the tray subassembly portion of the invention.
Figure 5:
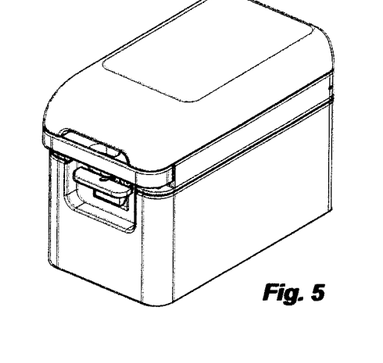
FIG. 5 is a top-left perspective view of the invention, with the tray in a retracted-and-stowed configuration.
Figure 9:
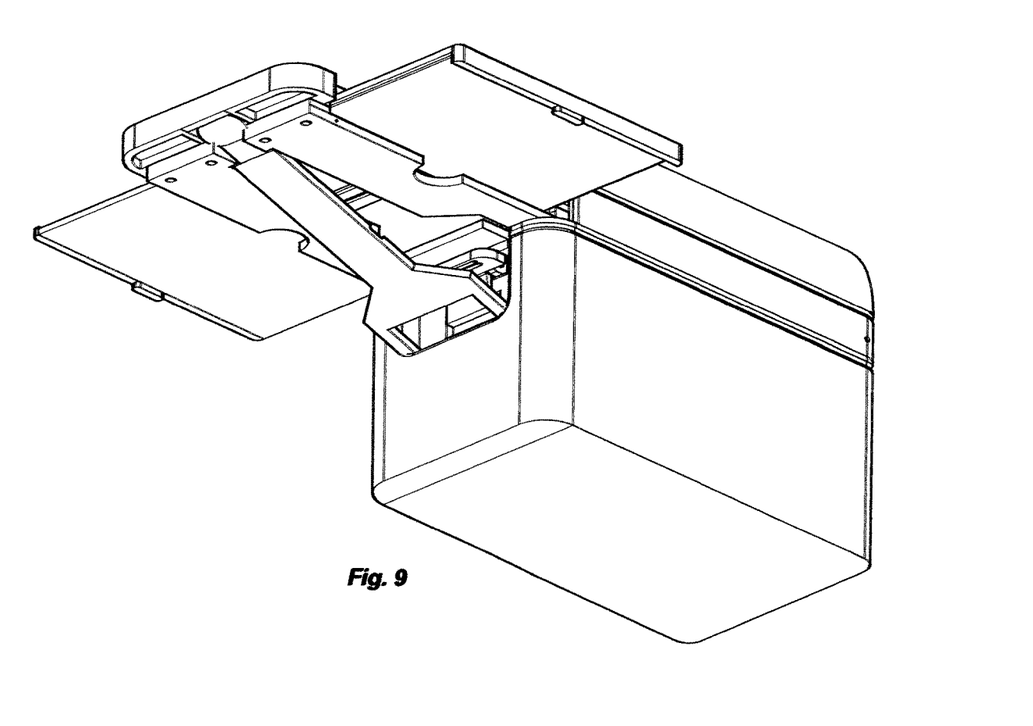
FIG. 9 is a left lower perspective view of the same structure shown in FIG. 8, showing details of the hinging of the support leg and the engagement of the support leg into a front face of the base portion of the console.

As shown in the exploded view of FIG. 4, foldable tray assembly 11 preferably has five main components. There is a generally flat rectangular slide tray top 111 which mates with a slide tray bottom 112, leaving left-side and right-side slots. One can slide out sideways a left-side tray extension 114 and/or slide out sideways a right-side tray extension 113, thereby tripling the horizontal surface available to support food or beverage items, or the like. Slide tray bottom 112 is preferably formed with a space to receive a fork-shaped tray support element 116, capable of pivoting down into a diagonal orientation as shown in FIG. 9. The pivot is achieved using a horizontal pivot pin 117 near the unforked front end of the tray support 116. The ends of pin 117 engage in hinge holes in slide bottom tray 112, as shown in the bottom perspective view of FIG. 9. The forked end preferably is supported in a notch formed in bottom portion 10, as shown in FIG. 9.

Figure 6:
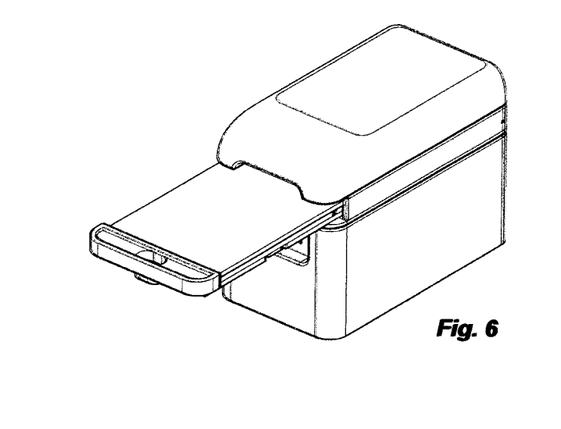
FIG. 6 is a view similar to FIG. 5, with the tray in a deployed or extended configuration.
Figure 7:
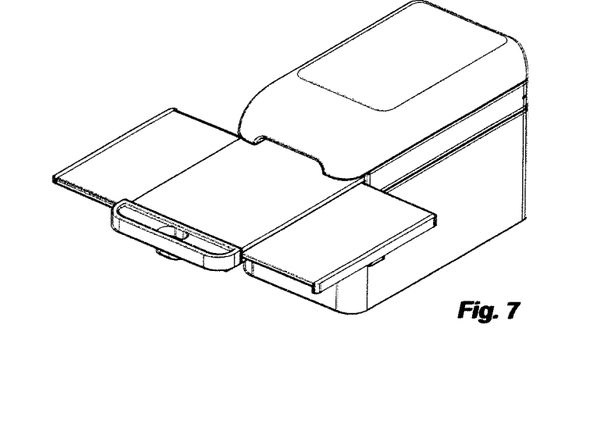
FIG. 7 illustrates laterally slidable left and right tray extensions, projecting from the deployed tray.
Figure 8:
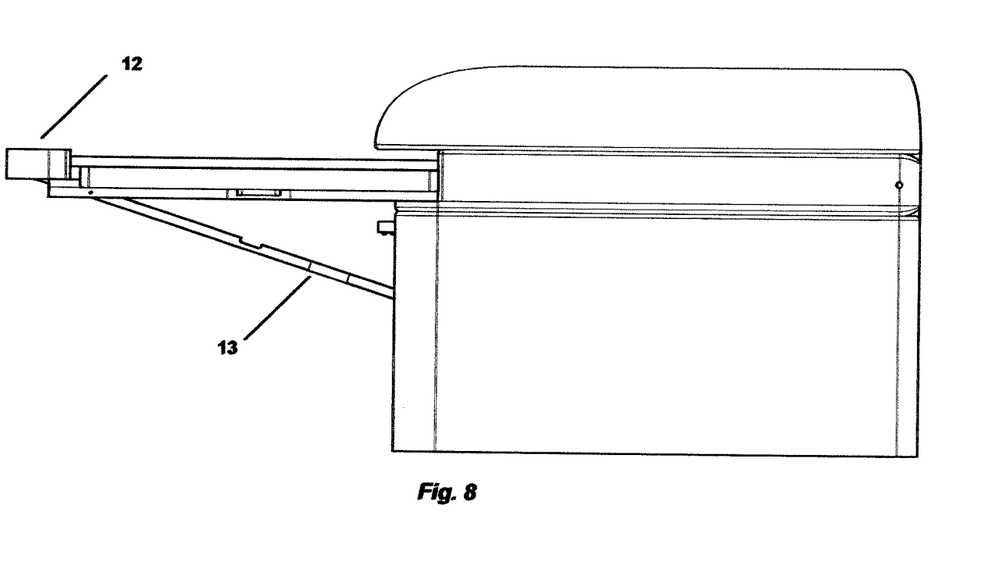
FIG. 8 is a left side view similar to FIG. 2C, showing the tray deployed and supported by a diagonally-oriented support leg.

FIGS. 6 & 8 show the tray deployed forward, and FIGS. 7 & 9 show the further deployment of the side-sliding trays 113 and 114.

FIG. 8 shows the diagonal orientation of support 116, and FIG. 9 is a bottom perspective view to illustrate the engagement of the fork end of support leg 116 in the front of bottom portion 10. This increases the weight-bearing capacity of the tray.

Figure 10:
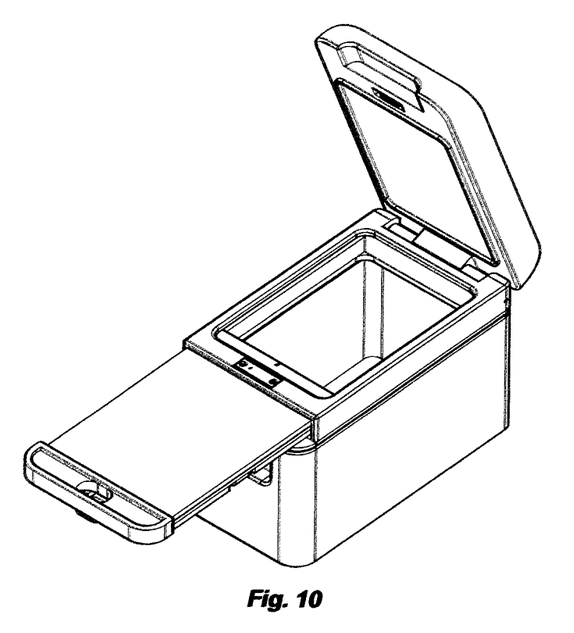
FIG. 10 is a top front perspective view, showing the tray deployed toward a dashboard of the vehicle and the cover pivoted upward, to permit access to an interior of the base portion.

FIG. 10 illustrates a configuration with the tray deployed forward and the cover 1 hinged open to allow storage access. Midframe 5 is revealed to be essentially a hollow rectangular frame.

Figure 11:
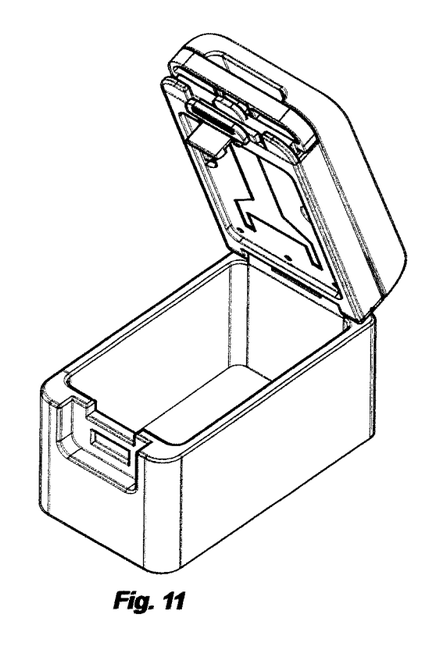
FIG. 11 is another top front perspective view, showing both the cover and the tray subassembly pivoted upward.

FIG. 11 illustrates how latch 8 can be released to permit upward pivoting of midframe 5, as well, for maximum storage access.

Those having ordinary skill in the automotive arts will understand that various modifications and refinements of the above-described structure are possible, within the scope of the inventive concept. For example, the storage portion need not be rectangular, but could be polygonal or circular. Therefore, the invention is not limited to the specific preferred embodiments shown and described, but rather is defined by the following claims.

The invention claimed is:

1. A combination center console and movable tray adapted for mounting in a motor vehicle, comprising
   a base unit adapted to be secured to a floor of a passenger compartment of said vehicle;
   a frame unit, pivotably secured to said base unit and formed with a generally rectangular horizontal slot;
   a generally planar tray slidable into and out of said horizontal slot in said frame unit, in order to furnish a horizontal surface for supporting any of food, beverages, writing materials and handheld electronic devices,
   a support leg pivotably coupled to said horizontally movable tray, in order to support said tray when said tray is slid out of said slot and
   a shoulder formed on a front surface of said base unit, adapted to engage with and support a bottom end of said support leg, when said support leg is in use and supporting said tray.

2. A combination center console and movable tray adapted for mounting in a motor vehicle, comprising
   a base unit adapted to be secured to a floor of a passenger compartment of said vehicle,
   a frame unit, pivotably secured to said base unit and formed with a generally rectangular horizontal slot, and a generally planar tray slidable into and out of said horizontal slot, said tray being slidable toward and away from a vehicle dashboard, and being coupled to lateral tray extensions, said extensions being adapted to be deployed in a direction orthogonal to a central axis of said horizontal slot of said frame unit;
   a support leg pivotably coupled to said horizontally movable tray, in order to support said tray when said tray is slid out of said slot; and
   a shoulder formed on a front surface of said base unit, adapted to engage with and support a bottom end of said support leg, when said support leg is in use and supporting said tray.

3. The combination of claim 2, further comprising
   a cover coupled along one edge thereof to said frame unit, and
   a magnet secured to one of said cover and said frame unit, in order to releasably secure said cover and said frame unit together.

4. The combination of claim 2, wherein said support leg is formed with a finger pull to facilitate stowing said support leg when not in use.

* * * * *